PHASE DEMODULATED HIGH FREQUENCY INVERTER

Filed Aug. 10, 1965 7 Sheets-Sheet 1

INVENTOR:
JIMMIE D. GILLETT
BY
Arthur M. Sloan
ATTORNEY

PHASE DEMODULATED HIGH FREQUENCY INVERTER

Filed Aug. 10, 1965 7 Sheets-Sheet 2

INVENTOR:
JIMMIE D. GILLETT
BY Arthur M. Sloan
ATTORNEY

PHASE DEMODULATED HIGH FREQUENCY INVERTER

Filed Aug. 10, 1965 7 Sheets-Sheet 3

INVENTOR:
JIMMIE D. GILLETT
BY Arthur M. Sloan
ATTORNEY

PHASE DEMODULATED HIGH FREQUENCY INVERTER

INVENTOR:
JIMMIE D. GILLETT
BY Arthur M. Sloan
ATTORNEY

PHASE DEMODULATED HIGH FREQUENCY INVERTER

Filed Aug. 10, 1965 7 Sheets-Sheet 5

INVENTOR:
JIMMIE D. GILLETT
BY Arthur M. Sloan
ATTORNEY

PHASE DEMODULATED HIGH FREQUENCY INVERTER

Filed Aug. 10, 1965 7 Sheets-Sheet 6

INVENTOR
JIMMIE D. GILLETT
BY Arthur M. Sloan
ATTORNEY

PHASE DEMODULATED HIGH FREQUENCY INVERTER

Filed Aug. 10, 1965 7 Sheets-Sheet 7

INVENTOR:
JIMMIE D. GILLETT
BY Arthur M. Sloan
ATTORNEY

United States Patent Office 3,409,817
Patented Nov. 5, 1968

3,409,817
PHASE DEMODULATED HIGH FREQUENCY INVERTER

Jimmie D. Gillett, Garland, Tex., assignor to Varo, Inc.
Filed Aug. 10, 1965, Ser. No. 478,595
16 Claims. (Cl. 321—5)

ABSTRACT OF THE DISCLOSURE

A switching power amplifier or phase demodulated high frequency inverter for converting direct current power to alternating current power. A DC to AC power converter operates at a given rate in a square wave switching mode and generates AC output power stepped up to the required voltage level by its output transformer which also provides isolation between the input and the output. The output is then phase demodulated at the desired output frequency by synchronously switched bilateral switching elements. The resultant output from the demodulator is a square wave at twice the converter operating frequency, deeply time modulated at the selected output frequency.

This invention relates to a switching power amplifier or phase demodulated high frequency inverter for converting direct current power to alternating current power and is concerned with power inverters of fixed or variable output frequency of a predetermined wave form that can be adjusted down to zero frequency. The invention is also concerned with servo amplifiers and with motor speed controls.

Inverters known in the art utilize a pair of semi-conductor devices operated in a push-pull system at the desired output frequency. These devices operate in conjunction with a center tapped transformer to convert the direct current input signal to an alternating square wave output signal of an amplitude proportional to the direct current input signal. A filter then converts the square wave to a sine wave by providing a low impedance to the fundamental frequency while presenting a high impedance to all other frequencies. This type of system has many disadvantages, the two outstanding being size and weight, particularly at low frequency. This is primarily due to the magnetic components transformers and filters which must be designed for the particular output frequency of the inverter. In the case where variable output frequencies are required, these disadvantages grow in proportion to the frequency range of operation. The filter gives rise to the greatest problem because a filter which must provide a sinusoidal output with low harmonic distortion cannot operate over a broad frequency range. Since most inverters require some type of voltage control of the output, various ways of regulating this output have been devised. One of the most common ways, termed pulse width control, controls the output by varying the ON time of a semiconductor device, while the operating frequency remains fixed. This presents a quasi square wave to the input of the filter so the fundamental output of the filter is a function of the amplitude and pulse duration of the quasi square wave. However, this control action results in harmonic voltages of a varying amplitude in the output wave form, which in turn results in increasing filtering problems. It also has a further disadvantage in that the OFF period of semiconductor devices reflects a high impedance in the output of the inverter. The disadvantage of high impedance has been overcome by several methods, the bridge inverter being the most common; however, this method of approach has the disadvantage that two semiconductive devices are connected in series on the primary side of the transformer, thus increasing the overall losses of the system.

Another shortcoming of presently known inverters is the speed of response. The theoretical limit of response for the standard inverter circuit is one cycle, but this cannot be obtained in actual practice due to control methods. The maximum speed of response obtainable by presently known inverters is 2 to 3 cycles of the output frequency, while commonly used inverters have a response of 4 to 10 cycles.

Still another failing of presently known inverters is the lack of ability to provide precise alternating current regulation. This is due to the method of regulation utilized in such inverters. The method comprises rectifying an alternating current output and filtering to provide a direct current voltage which is a function of the alternating current output voltage. This rectification and filtering of alternating current voltage gives an average value of the alternating current voltage, and not a true or RMS value of the alternating current voltage. This would not be a problem if the output were of a pure sine wave nature; however, it is comprised of various harmonic voltages other than the fundamental and such harmonic voltages vary in amplitudes as the output voltage is regulated over its regulation limits. The varying harmonic voltages result in the average direct current voltages being unrepresentative of the RMS voltage of the output.

Yet another disadvantage of most presently known inverters, and three phase inverters in particular, is the phase shift in the output filter. In most cases this is of small importance in the single phase inverter, but in three phase units where the load is sensitive to phase angle diversions between the three phases, this becomes a major problem. Where some method of phase angle control is not utilized this phase shift can be as high or higher than 10 degrees, which is unacceptable in many three phase applications. Where precise phase angle control is desired, additional control loops must be incorporated into the overall control system to regulate the phase angle between the various outputs. The addition of these control loops provides phase angle control on the order of 2 to 4 degrees but reduces over-all reliability of the system by complicating the control circuitry.

A further disadvantage of prior art inverters is their inability to handle variable low power factor loads. Where low power factor loads are present they draw reactive currents which are out of phase with the square wave switching voltage produced. Since these devices are on for certain duty cycles, the reactive currents have no readily available current path, thus current does not flow in a proper manner and the unit malfunctions. This is especially true in a unit which must carry leading and lagging power face loads.

The inability to handle unbalanced loads on three phase systems constitutes an additional failing of most prior art inverters. Where load unbalance is extreme, large phase shifts appear in the output of the unit between the various phases. These phase shifts are extremely difficult to regulate and must be tolerated in most systems where unbalanced loads are present.

The phase demodulated high frequency inverter or low frequency power amplifier of this invention has many advantages over the prior art devices, a few of which are as follows:

(1) The fundamental frequency component is not introduced in the output of the transformer as is the case in phase modulated types. Accordingly a considerable reduction in transformer size and weight is possible because less iron is required for high-frequency operation.

(2) In the three phase version the converter does not carry any of the reactive components found in low power factor loads at each phase. Accordingly, the peak reactive load currents are not carried to the switching element since all of the instaneous power from each of the three phases is made common at the secondary of the converter. The converter always delivers power in the forward direction at a fairly uniform rate, regardless of the power factor of the load. Considerable weight and space reduction results.

(3) The response time of the loop feedback is a function of the operating frequency of the converter rather than of the low frequency output resulting in extremely fast response time, on the order of several cycles of the carrier frequency, i.e., high frequency power amplifier frequency.

(4) The output follows a reference sine wave very closely throughout the cycle effecting a minimum deviation from a true sine wave in the output as a result of the fast response time.

(5) In the three phase version a very close three phase symmetry is maintained regardless of input voltage and output load conditions because of the fast response time.

(6) Transient suppression is excellent as a result of the fast response time.

(7) There is inherent circuit reliability because of the bilateral switching in the output allowing current flow in either direction. Bilateral switching also effects extreme tolerance of low power factor loads.

(8) The reduction in the number of components effects improved reliability.

(9) Any wave form DC to a cutoff frequency determined by the switching frequency of the power amplifier may be synthesized. Typically using this technique one may expect to pass frequencies up to 3 cycles of the power amplifier frequency.

(10) Regulation is a direct function of the stability of a reference waveform which may be as accurate as ±.1 percent.

Briefly in this invention a DC to AC power converter operates at a given rate in a square wave switching mode and generates AC output power stepped up to the required voltage level by its output transformer which also provides isolation between the input and the output. The output is then phase-demodulated at the desired output frequency by synchronously switched bi-lateral switching elements. The resultant output from the demodulator is a square wave at twice the converter operating frequency, deeply times modulated at the selected output frequency. A low pass filter removes the high frequency components and the resulting output is a predetermined wave form at the demodulated frequency. Voltage frequency, and phase regulation in this system are controlled by the instantaneous phase relationship existing between the converter and phase demodulator.

Accordingly, it is an object of this invention to provide a switching inverter which will be of light weight and small size.

Another object of this invention is to provide an inverter whose output frequency is unrelated to its weight and size.

Still another object of this invention is to provide an inverter which will have greatly increased regulation response time of the output which is also unrelated to the output frequency of the inverter.

A further object of this invention is to provide an inverter which will have precise alternating current regulation whose accuracy is not related to the harmonic distortion.

Yet a further object of this invention is to provide an inverter which will have a low output impedance at all times.

Another object of this invention is to provide a three-phase inverter in which the phase angle between phases can be maintained accurately.

An additional object of this invention is to provide an inverter which will supply low power factor loads of a leading and lagging nature.

Yet another object of this invention is to provide a three-phase inverter which will operate into unbalanced loads with little or no inner reaction between phases due to unbalanced loads.

Still an additional object of this invention is to provide an inverter which will have a high efficiency and a high amount of reliability, yet still provide many of the desired operating parameters which cannot be provided with the prior art devices.

It is still a further object of this invention to provide an improved inverter for converting direct current power to alternating current power of precision amplitude, frequency, and phase which is synchronized with that of an internal control signal.

Another object of this invention is to provide an inverter which is capable of supplying alternating current power of precision amplitude, frequency, and phase that is synchronized with an external input signal and can be remotely controlled from some distant point.

Other objects of this invention will be apparent from the description, the appended claims and drawings in which:

Figure 1:
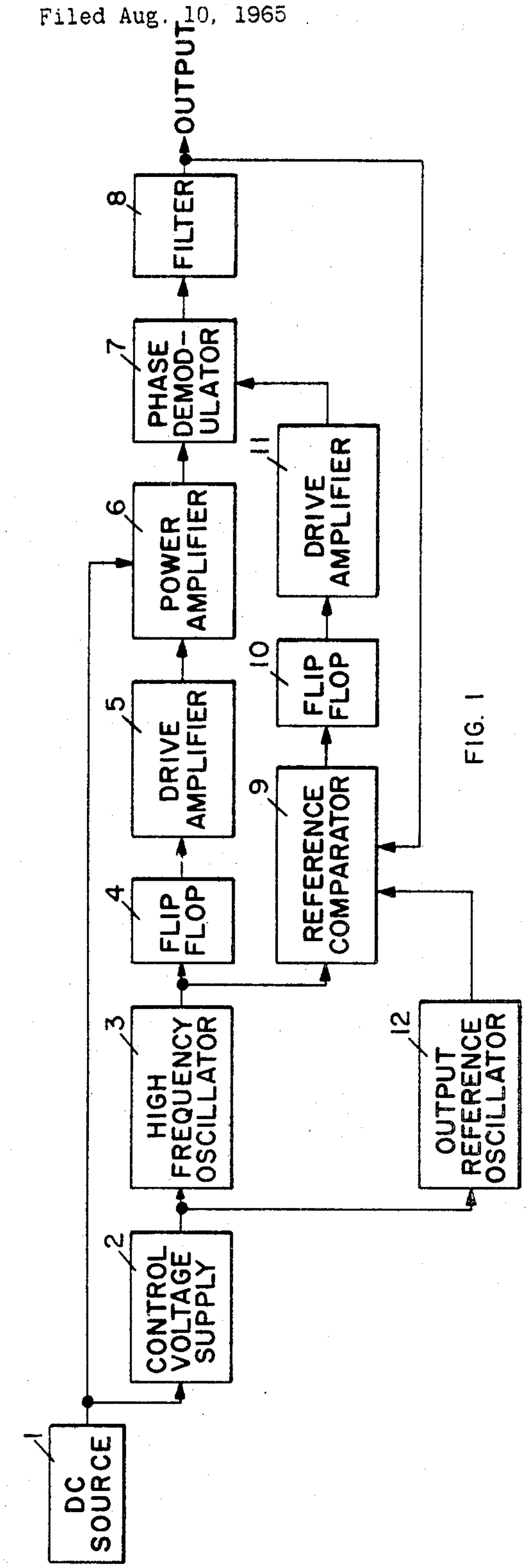
FIGURE 1 is a block diagram of a single phase inverter in accordance with the invention.

Referring to the drawings, FIGURE 1 is a block diagram of a single phase version of the invention representing an inverter for converting direct current energy to alternating current energy of a precision amplitude, frequency, and phase relationship to the reference control signal. The inverter includes eleven major operating modules. Direct current power from direct current source 1 is converted to alternating current square wave power by power amplifier 6. Power amplifier 6 is driven by high frequency oscillator 3 through flip-flop 4 and drive amplifier 5. The output of power amplifier 6 is fed into filter 8 through phase demodulator 7 which controls the output frequency, amplitude, and phase. The phase demodulator 7 is driven by reference comparator 9 through flip-flop 10 and drive amplifier 11. The reference comparator 9 has three inputs, the first being a signal from the high frequency oscillator 3, the second being the signal from the output reference oscillator 12, and the third being the output from the filter 8. Control voltage supply 2, which is connected to the direct current source 1, provides the power for high frequency oscillator 3 and output reference oscillator 12.

Figure 2:
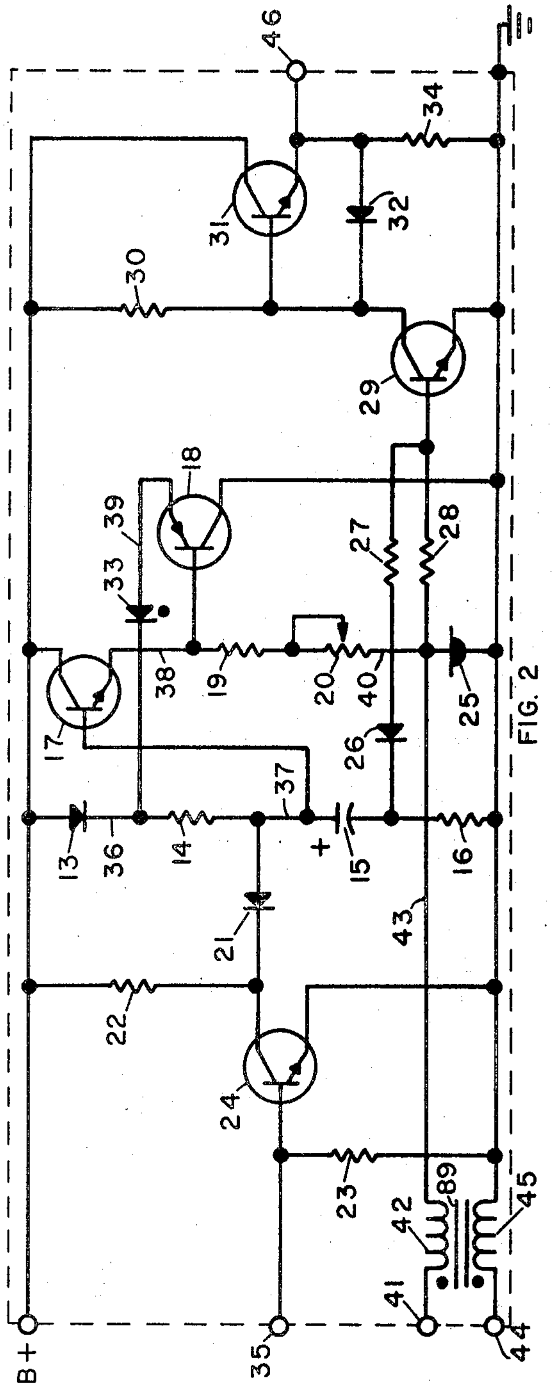
FIGURE 2 is a schematic representation of the reference comparator circuitry.
Figure 3:
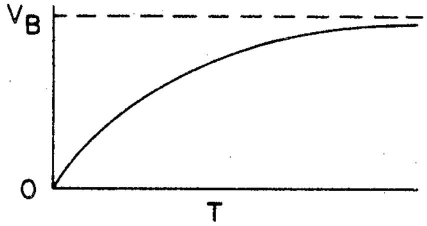
FIGURE 3 is a wave form diagram of the capacitor charging voltage.
Figure 4:
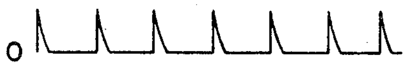
FIGURE 4 is a wave form diagram of the high frequency oscillator pulse.
Figure 5:
FIGURE 5 is a wave form diagram of a non-linear saw-tooth voltage.
Figure 6:
FIGURE 6 is a wave form diagram of a linear saw-tooth voltage.

In FIGURE 2, the reference comparator 9 is shown schematically. The reference comparator is an essential element of this invention. The reference comparator 9 provides an output pulse signal which has been delayed from the input reference signal of the high frequency oscillator 3 by some time period which is a function of the difference of the output reference oscillator 12 and the output from filter 8. Resistor 14, capacitor 15, and resistor 16, along with diode 21, resistor 22, resistor 23, and NPN transistor 24 operate together to form a saw-tooth generator. When resistor 14, and capacitor 15 are connected between B+ and ground, a voltage as illustrated in FIGURE 3 develops at point 37. This is the charging potential that appears across a capacitor when it is charged through a resistor from some direct current source. The pulse from high frequency oscillator 3 illustrated in FIGURE 4 is coupled to the base of transistor 24 at point 35 to form a synchronizing circuit. When the pulse turns on transistor 24, the positive side of capacitor 15 is connected to ground forcing the capacitor to discharge thus modifying the signal illustrated in FIGURE 3 to form a saw-tooth as shown in FIGURE 5. In order to give the curve of FIGURE 5 a more linear form during the charging period of capacitor 15, a constant current diode 13, NPN transistor 17, resistor 19, PNP transistor 18 and zener diode 33 are added to the circuitry. These elements are connected together to form what is often denominated a "boot strap" circuit. That is, the potential at point 36 is made a function of the potential appearing at point 37. Point 37 is connected to the base of NPN transistor 17 to form an emitter follower. This results in the potential at point 38 being directly proportional to the potential at point 37. The potential at point 39 is proportional to the potential at point 38 for the same reasons. Diode 33 being a zener diode, holds a fixed voltage level between points 36 and 37. This voltage being fixed, the current through resistor 14 will be held constant, thus causing the charging voltage across capacitor 15 to take a linear form as shown in FIGURE 6. The constant current diode 13 is selected to supply the current required to charge capacitor 15 and break over the zener diode 33 so that it remains in its proper operating mode.

Figure 7:
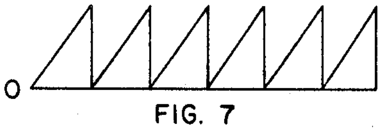
FIGURE 7 is a wave form diagram of a saw-tooth current.
Figure 12:
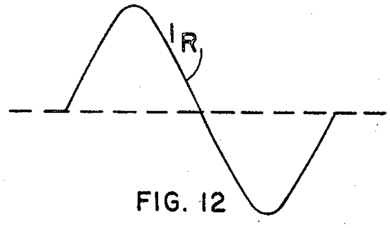
FIGURE 12 is a wave form diagram of the reference current.
Figure 13:
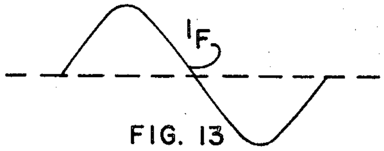
FIGURE 13 is a wave form diagram of the feedback current which is a function of the output $I_F$.
Figure 14:
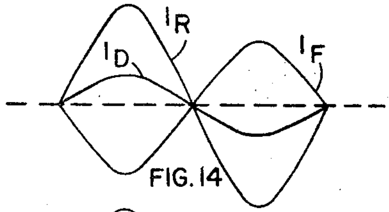
FIGURE 14 is a wave form diagram of the resultant current $I_D$.
Figure 15:
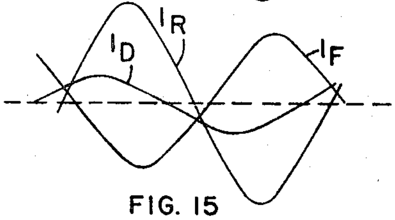
FIGURE 15 is a diagram of a set of curves showing the effect of a phase shift in the output on $I_D$.
Figure 8:
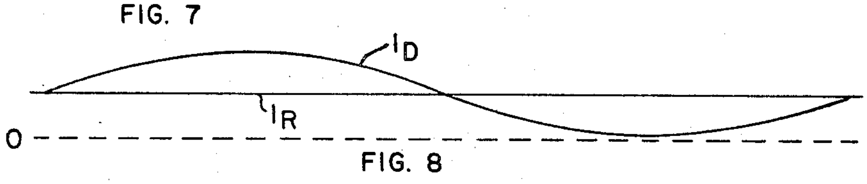
FIGURE 8 is a wave form diagram showing a sinusoidal current ($I_D$) superimposed over a trigger point current ($I_p$).
Figure 9:
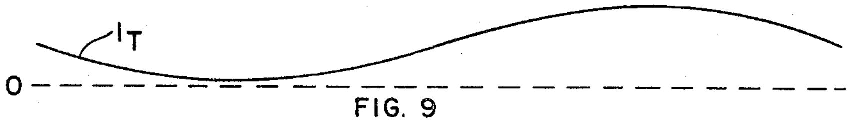
FIGURE 9 is a wave form diagram showing the locus of a new trigger point arrived at by subtracting $I_D$ from $I_p$ so that the trigger point is a function of the sinusoidal current.

The proportionality of the voltage at point 38 to that at point 37 causes a saw-tooth voltage wave to be imposed across resistors 19 and 20. Since the voltage is a saw-tooth, the current through resistors 19 and 20 is also a saw-tooth as shown in FIGURE 7. This current is present at point 40. Tunnel diode 25 has a negative resistance region which is a function of the current through tunnel diode 25. When the current reaches a level, denoted $I_p$, the voltage, denoted $V_p$ will immediately jump to a higher value determined by the load line on the device. The resulting voltage will be on the order of $5V_p$. The $I_p$ point, known as the trigger point, is utilized to gain an abrupt voltage increase without any increase in current levels. This abrupt voltage increase is utilized to drive transistor 29. If a sinusoidal current, denoted $I_D$, is superimposed over $I_p$, as illustrated in FIGURE 8, then a locus of a new trigger point may be plotted, as shown in FIGURE 9. This is done in accordance with the formula $I_T = I_p - I_D$ such that the trigger point is now a function of the sinusoidal current. The sinusoidal current that is superimposed is made a function of the output reference oscillator and a feedback signal from the output of the inverter. This is done in transformer 89 to which the signal from the reference oscillator is fed from point 41 through winding 42 of transformer 89 to point 43. The signal at point 41 is illustrated in FIGURE 12. If there is no feedback signal, this signal at point 41 will also appear at point 43. If point 44 is connected to the output of the inverter, then there will be a current reflected into winding 42 by winding 45, which is proportional to the output. This current is shown in FIGURE 13 as $I_F$. There are then two currents flowing in winding 42, the reference current $I_R$ and current which is a function of the output $I_F$. This will cause a resultant current $I_D$ at point 43, where $I_D = I_R - I_F$, as illustrated in FIGURE 14. As is apparent, any change in the output current results in a corresponding change in the current $I_D$. FIGURE 15 is a set of curves showing the effect of a phase shift in the output where the output $I_F$ is lagging the reference signal $I_R$. This has caused the current $I_D$ to shift so that it leads the reference signal $I_R$. This in turn causes the output $I_F$ to shift back to its original position as shown in FIGURE 13.

The current shown in FIGURE 14 as $I_D$ is the same current shown in FIGURE 8 as $I_D$. As depicted in FIGURE 8 the current $I_D$ was used to vary the current $I_p$ to give a new current $I_T$, shown in FIGURE 9.

By combining the saw-tooth current shown in FIGURE 7 and the new trip current $I_D$ of the tunnel diode 25, the trip point of the tunnel diode 25 is related to the output of the inverter through the current $I_D$.

Figure 10:
FIGURE 10 is a wave form diagram of saw-tooth trigger point locations.

FIGURE 10 shows that each time the ramp of the saw-tooth crosses the trip point curve $I_T$, the tunnel diode changes state and goes into a negative resistance region. This causes the voltage across the diode to increase in a step manner. This voltage is used to drive NPN transistor 29 from a non-conducting state to a saturated state.

Figure 11:
FIGURE 11 is a wave form diagram of the reference comparator output.

NPN transistor 31 is connected so that when NPN transistor 29 is turned on, transistor 31 is turned off. Also when transistor 29 turns off, transistor 31 turns on. Thus the voltage wave shown in FIGURE 11 is developed at point 46. This voltage is used to drive flip-flop 10.

Resistor 27 and diode 26 are connected to the base of transistor 29 so that when capacitor 15 is reset by the high frequency oscillator 3, the capacitor 15 discharge current will turn off transistor 29 and reset tunnel diode 25 to its positive resistance region.

Resistor 28 is a current limiting resistor which limits the current at the base of transistor 29. Resistor 30 is a current limiting resistor and provides B+ to the base of transistor 31 turning it on when transistor 29 is off. Resistor 30 is connected so that the proper current will flow to provide ample drive current to transistor 31 so that the trigger capacitors in the flip-flop 10 are fully charged. Diode 32 provides a lower impedance unidirectional discharge path through point 46 to ground. Point 46 is connected to the pair of trigger capacitors in the flip-flop 10. Turning transistor 31 on charges the pair of trigger capacitors in the flip-flop 10. When transistor 29 is on and transistor 31 is off, point 46 provides a path to ground through diode 32 and transistor 29 thus discharging the pair of trigger capacitors in the flip-flop 10 and the flip-flop 10 reverts state. Resistor 34 ties the emitter of transistor 31 to ground so that when transistor 29 is on the base of transistor 31 is taken to a lower voltage than the emitter assuring that transistor 31 turns off completely.

Figure 16:
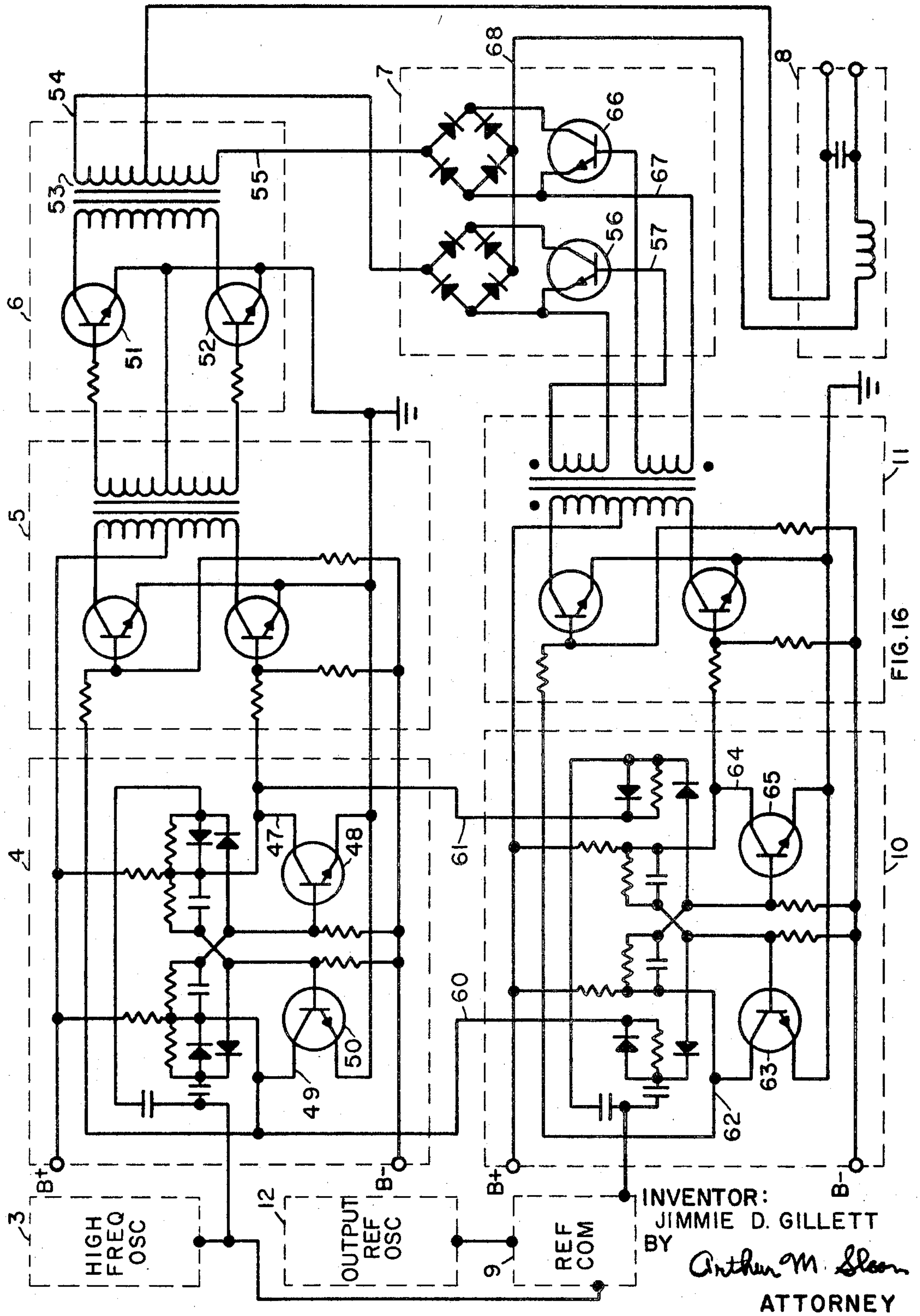
FIGURE 16 is a schematic representation showing phase relationships of the high frequency oscillator, the reference comparator, the drive amplifiers, the power amplifier, the phase demodulator, the flip-flops, the filter, and the output reference oscillator of the inverter.
Figure 17:
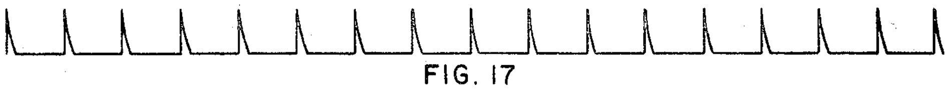
FIGURE 17 is a wave form diagram of the output of the high frequency oscillator used to trigger the flip-flop 4.
Figure 18:
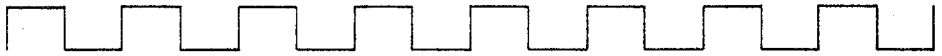
FIGURE 18 is a wave form diagram of the voltage wave shape of the output of the flip-flop 4 at point 47.
Figure 19:
FIGURE 19 is a wave form diagram of the voltage wave shape of the output of the flip-flop 4 at point 49.

FIGURE 16 shows certain phase relationships of the high frequency oscillator 3, the flip-flop 4, the drive amplifier 5, the power amplifier 6, the phase demodulator 7, the filter 8, the reference comparator 9, the flip-flop 10, the drive amplifier 11, and the output reference oscillator 12. The output reference oscillator 12 is shown in block diagram since it could take various forms well known to the art, such as the Wien Bridge oscillator, the Hartley oscillator, or a Colpitts oscillator, any of which would provide a low distorted output sine wave. Flip-flop 4, drive amplifier 5, power amplifier 6, phase demodulator 7, filter 8, flip-flop 10, and drive amplifier 11, are shown in schematic form to illustrate phase relationships at various points within the circuitry; all of these schematically illustrated circuits are well known in the art. The output of the high frequency oscillator shown in FIGURE 17 is used to trigger flip-flop 4 which is a standard re-set flip-flop, well known in the art. The output of the flip-flop 4 takes a form as shown in FIGURES 18 and 19. FIGURE 18 represents the voltage wave shape as seen at point 47 which is the collector of NPN transistor 48, while FIGURE 19 represents the voltage wave form at point 49 which is the collector of NPN transistor 50. This output is amplified by a standard push-pull amplifier well known in the art, and designated drive amplifier 5. The output of drive amplifier 5 is used to drive NPN transistors 51 and 52, in power amplifier 6. Power amplifier 6 further amplifies this drive signal so that the output of transformer 53 will have a set of square wave voltages as shown in FIGURES 22 and 23.

Figure 22:
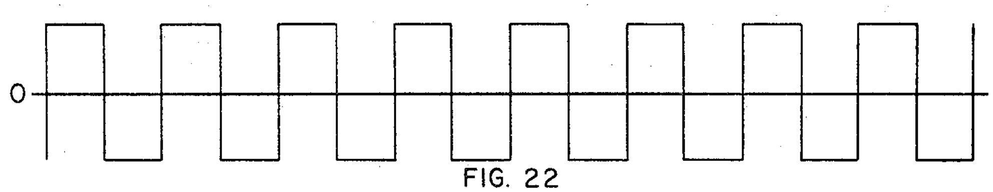
FIGURE 22 is a wave form diagram of the output voltage of transformer 53 at point 54.
Figure 23:
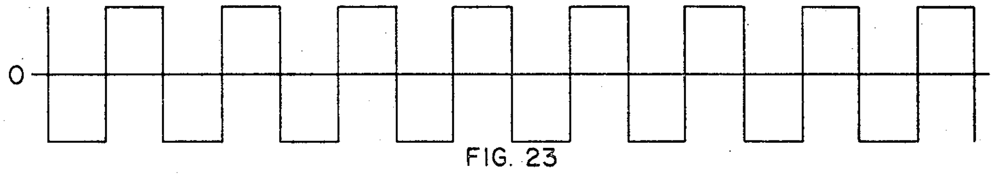
FIGURE 23 is a wave form diagram of the output voltage of transformer 53 at point 55.

FIGURE 22 shows the voltage at point 54, while FIGURE 23 represents the voltage at point 55. These square wave voltages are fed into the phase demodulator 7 which is composed of two sets of bi-lateral switches. The purpose of the phase demodulator is to provide a set of switching elements which are bi-lateral; that is, they can handle current flow in either direction and are controlled by the application of a control signal. A number of different types of bi-lateral switches may be used. For purposes of illustration bi-lateral switches utilizing NPN transistors are shown. PNP transistors or other semiconductive switch elements could be utilized as well as NPN transistors.

Figure 20:
FIGURE 20 is a wave form diagram of the output of the flip-flop 10 at point 62.
Figure 21:
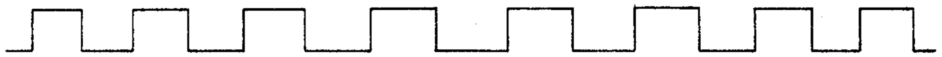
FIGURE 21 is a wave form diagram of the output of the flip-flop 10 at point 64.
Figure 24:
FIGURE 24 is a wave form diagram of the output of the drive amplifier at point 57.
Figures 25, 26:
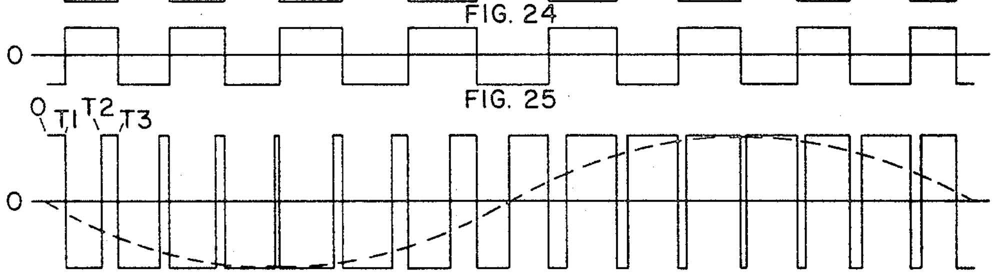
FIGURE 25 is a wave form diagram of the output of the drive amplifier at point 67.
FIGURE 26 is a diagram of the development of the output wave form of the demodulator from time periods.
Figure 27:
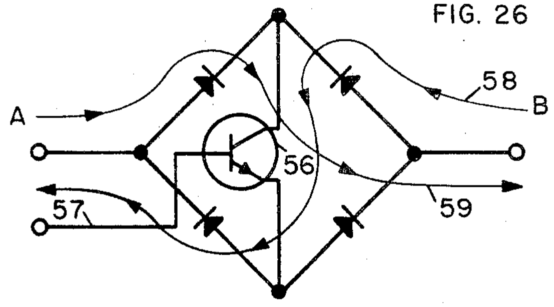
FIGURE 27 is a schematic diagram of one of the bilateral switches showing current flow.

FIGURE 27 illustrates one of the bi-lateral switches and shows a possible direction of current flow. When NPN transistor 56 is turned on by a control signal at point 57, it is possible for current to flow in either the direction of current path 58 or the direction of current path 59. The drive for both sets of bi-lateral switches originates at flip-flop 10, which is controlled by the pulse from the reference comparator 9, which pulse is shown in FIGURE 11. Flip-flop 10 is also a standard reset flip-flop that has been phase locked to flip-flop 4 by interconnections 60 and 61. This phase lock is necessary to obtain the proper phasing between the output of transformer 53 and the drives to the transistors in the phase demodulator 7. The output from the output reference oscillator 12 triggers flip-flop 10 in a manner similar to the manner in which the high frequency oscillator 3 triggers flip-flop 4; that is, each time the voltage wave form goes from a positive value to ground the flip-flop reverts state so that the side that was conducting turns off and is non-conducting, while the side that was non-conducting turns on and starts conducting. The phase locking interconnections 60 and 61 effect the proper phase relationship of flip-flop 10 to flip-flop 4. This is essential for proper operation of the inverter. The output of the flip-flop is shown in FIGURES 20 and 21 with FIGURE 20 being the wave form at point 62 which is the collector of NPN transistor 63 and FIGURE 21 being the wave form at point 64, which is the collector of NPN transistor 65. The flip-flop signals are amplified by drive amplifier 11 so that they will be of sufficient power level to drive phase demodulator 7 transistors 56 and 66. The output of the drive amplifier 11 that appears on the base of transistor 56 at point 57 is shown in FIGURE 24. The signal that appears on the base of transistor 66 at point 67 is shown in FIGURE 25.

FIGURE 16 and the wave forms shown in FIGURES 22 through 25 illustrate the varying phase relationships between the output transformer 53 of power amplifier 6 and the two power transistors 56 and 66 in the phase demodulator 7. By taking several time periods as shown in FIGURE 26 the output wave form of the phase demodulator 7 is developed. The first period covered is from zero to T1 which represents the time that power transistor 56 is on and point 54 is positive. For this time period there is a positive voltage developed at point 68. At time T1, transistor 56 goes off and transistor 66 turns on. This in turn permits the negative signal at point 55 to appear at point 68. This negative signal remains at point 68 from period T1 to T2. At time T2 point 55 goes positive while transistor 66 remains on. This in turn permits point 68 to go positive. Point 68 remains positive from time period T2 to T3 at which time transistors 56 and 66 revert states again so that transistor 56 is on. This again produces a negative voltage at point 68 since point 54 is negative. This switching action can be followed and as noted, the wave form shown in FIGURE 26 is developed. Comparison of FIGURE 26 and FIGURE 11 shows that FIGURE 26 is an amplified version of FIGURE 11. Since FIGURE 11 was developed from a sinusoidal source it is apparent that if the voltages shown in FIGURE 26 were passed through a low pass filter such as filter 8, a sinusoidal voltage would appear at the output terminals of filter 8. A sinusoidal voltage does appear at the terminals of filter 8 as shown in dashed lines in FIGURE 26. This sinusoidal voltage has an identical phase and frequency to that of the current shown in FIGURE 9.

Figure 29:
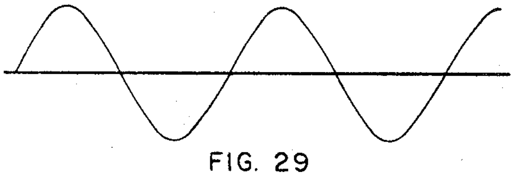
FIGURE 29 is a wave form diagram of the output of the reference oscillator 12.
Figure 30:
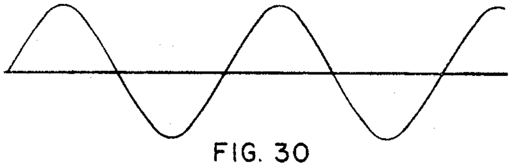
FIGURE 30 is a wave form diagram of the output voltage from the phase splitter at point 71.
Figure 31:
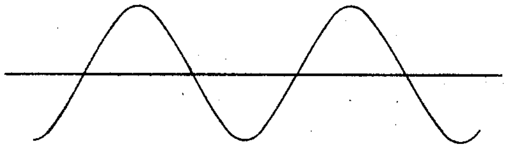
FIGURE 31 is a wave form diagram of the output voltage from the phase splitter at point 72.
Figure 32:
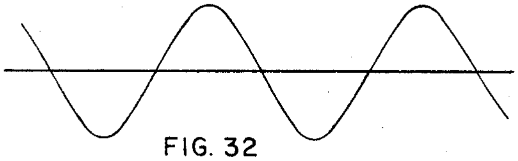
FIGURE 32 is a wave form diagram of the output voltage from the phase splitter at point 73.

A 3-phase version of the single phase inverter described above is shown in block form in FIGURE 28. The primary difference between the 3-phase inverter and the single phase inverter is the addition of the phase splitter 69 and a new power amplifier 70 which replaces power amplifier 6 of FIGURE 1. The phase splitter 69 is driven by the output reference oscillator 12 and divides the output of the output reference oscillator 12 into three sinusoidal voltages 71, 72, and 73 which have a phase angle of 120° between phases. These voltages are shown in FIGURES 30, 31, and 32. The input to the phase splitter 69 is shown in FIGURE 29. FIGURE 30 shows voltage 71, phase A. FIGURE 31 shows voltage 72, phase B. FIGURE 32 shows voltage 73, phase C. Each of these three phases, A, B, and C is utilized by its reference comparator in the same manner described in the above discussion of the single phase inverter.

Figure 28:
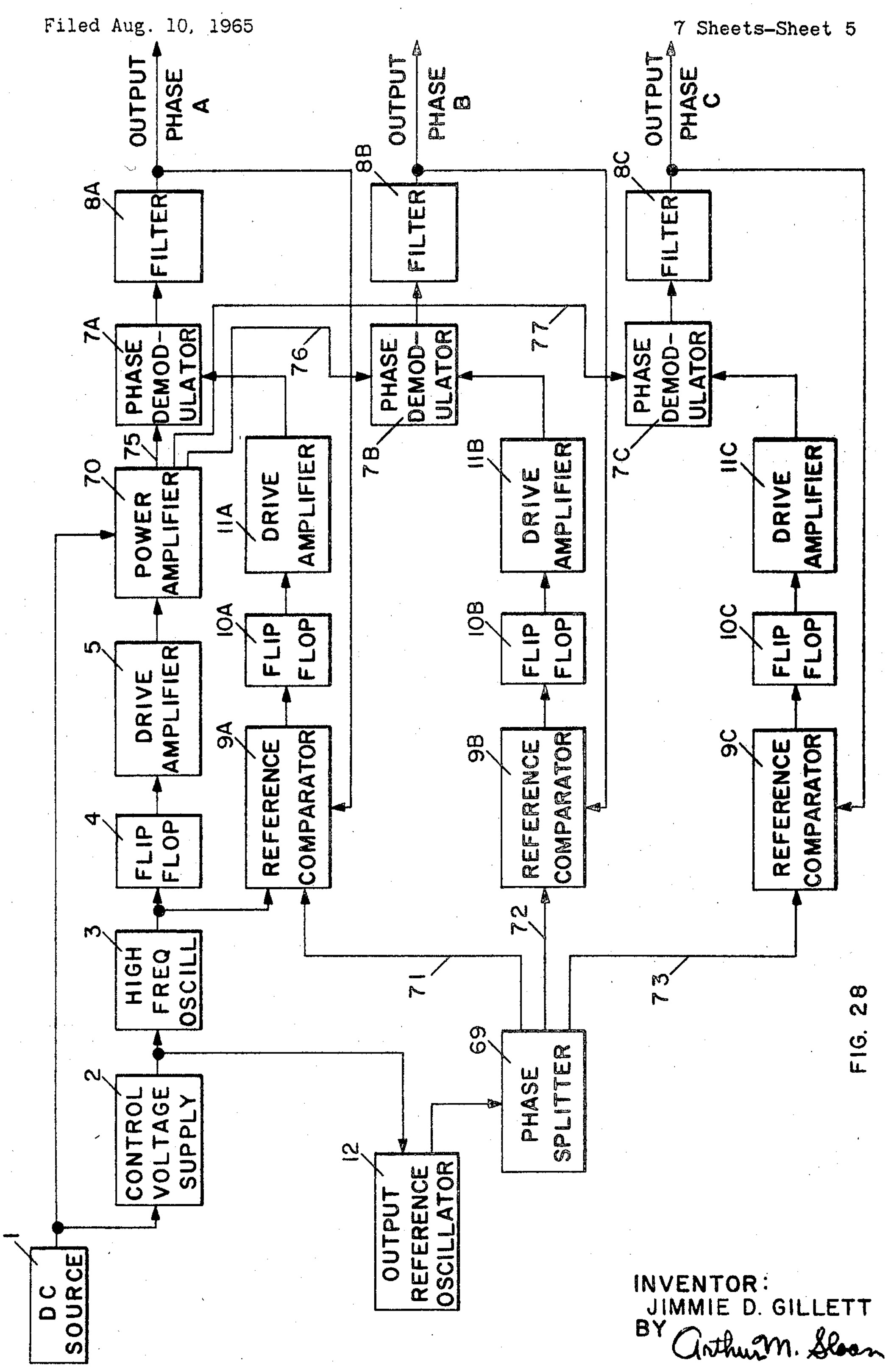
FIGURE 28 is a block diagram of the principles of the invention embodied in a three phase inverter.

The various blocks in FIGURE 28 are designated as in FIGURE 1 except that the letter suffixes A, B, and C indicate their function as to a particular output phase A, B, or C. That is, reference comparator 9A, flip-flop 10A, drive amplifier 11A, phase demodulator 7A and filter 8A all correspond to and control the output of phase A as a function of output voltage 71, phase A, or the phase splitter 69. Since these components which appear also in FIGURE 1 perform in the identical manner previously described, the description of their operation will not be repeated.

Figures 33, 34:
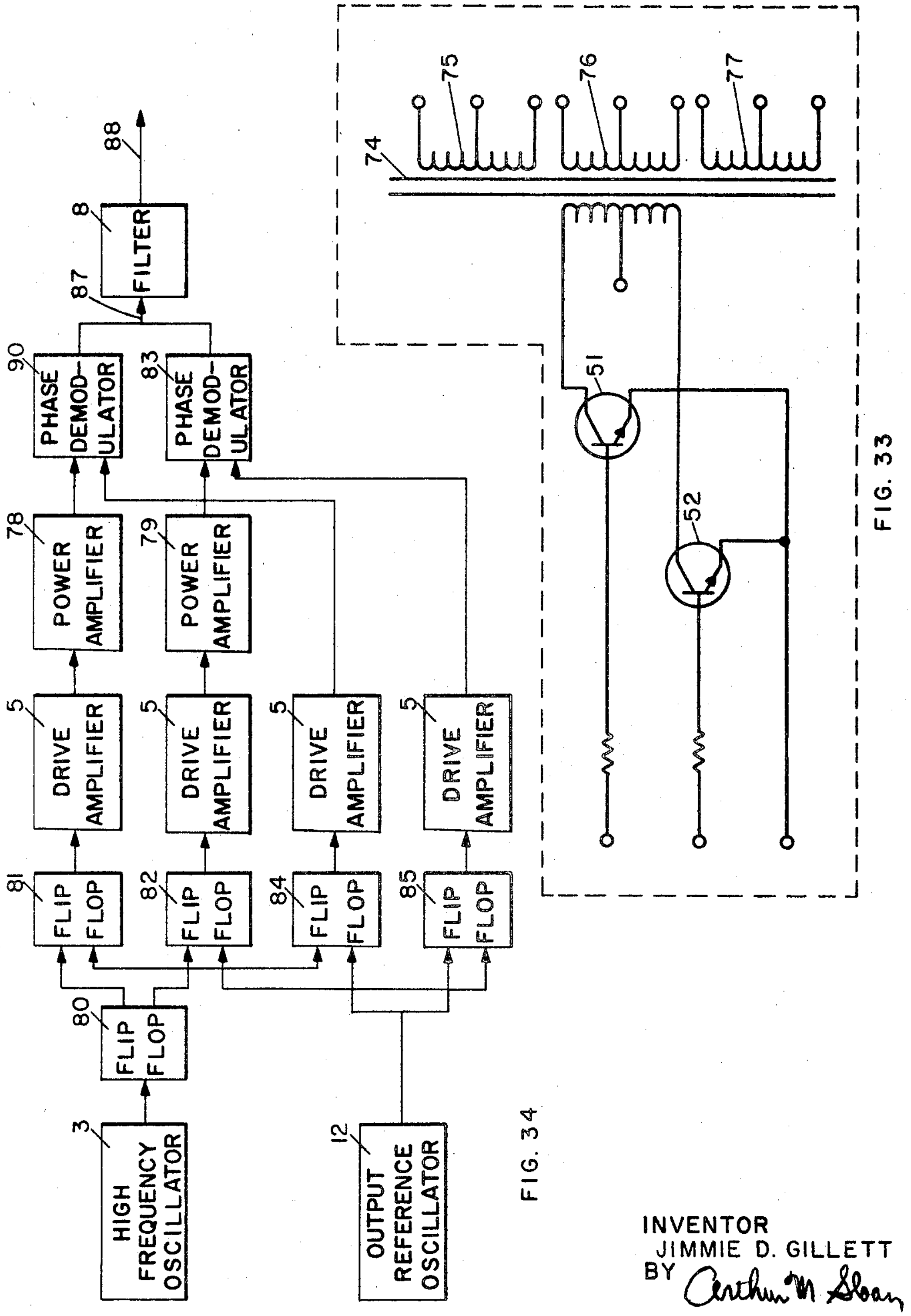
FIGURE 33 is a schematic diagram of the three phase power amplifier.
FIGURE 34 is a block diagram of another form of the phase demodulator which provides lower harmonic distortion and faster response time.

Power amplifier 70 differs from power amplifier 6 only in that power amplifier 70 has three sets of output terminals rather than one. Power amplifier 70 is shown in FIGURE 33. The output windings of transformer 74 are connected as follows: Output winding 75 is connected to phase demodulator 7A and provides power for output phase A. Output winding 76 is connected to phase demodulator 7B and provides power for output phase B. Output winding 77 is connected to phase demodulator 7C and provides power for output phase C. Since there is no phase shift in the filter as was shown in the discussion of the single phase inverter, the outputs of phase A, phase B, and phase C will be identical to the reference voltages shown in FIGURES 30, 31, and 32.

Figure 36:
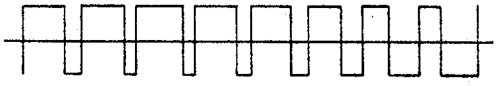
FIGURE 36 is a wave form diagram showing the output of power amplifier 78.
Figure 37:
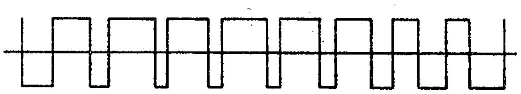
FIGURE 37 is a wave form diagram of the output of power amplifier 79.
Figure 38:
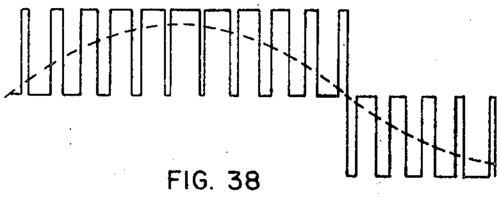
FIGURE 38 is a wave form diagram of the resultant voltage at the input terminal of the filter at point 87.
Figure 35:
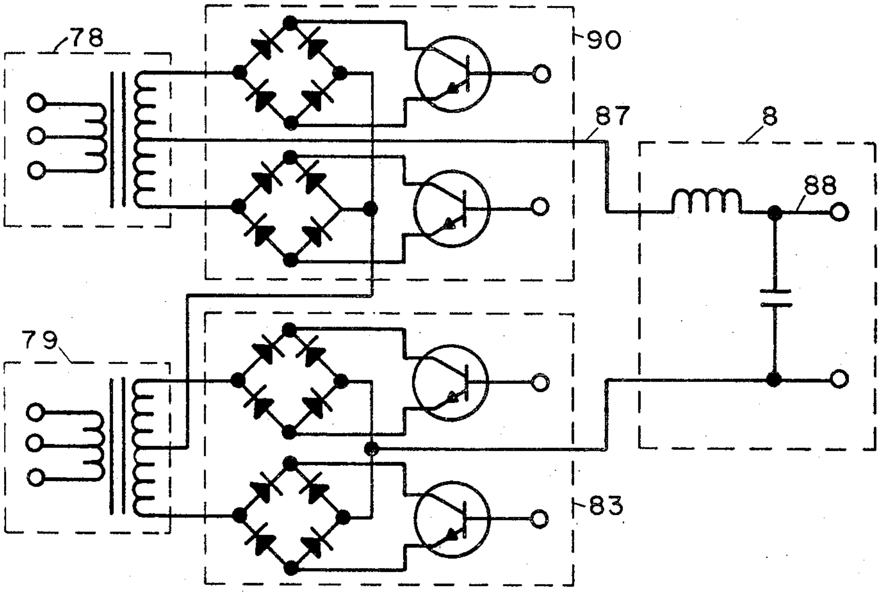
FIGURE 35 is a partial schematic representation of the phase demodulator of FIGURE 34 showing the transformer connections and the demodulator connections.

Another version of the phase demodulator which offers lower harmonic distortion and faster response time is shown in block diagram in FIGURE 34. This version may be in a single phase or three phase inverter, but only the single phase inverter will be described. Two power amplifiers 78 and 79 are operated 90° out of phase. The 90° phase shift is developed by flip-flop 80 which drives flip-flops 81 and 82. Flip-flop 80 is operated in a standard frequency divider network well known in the art. There are also two phase demodulators 90 and 83, which are driven by their respective flip-flops 84 and 85 and drive amplifiers 5. The flip-flop 84 which furnishes a drive for demodulator 90 is phase locked to flip-flop 81 in the same manner described in the discussion of the single phase inverter of FIGURE 1. Flip-flop 85 which furnishes drive to demodulator 83 is phase locked to flip-flop 82 in a like manner. The outputs of the phase demodulators 90 and 83 are connected in series prior to connection to the filter 8. FIGURE 35 is a partial schematic showing the demodulator connections of phase demodulators 90 and 83 and the transformer connections of power amplifiers 78 and 79. The output of power amplifier 78 prior to being added in the series connection is shown in FIGURE 36 while the output of power amplifier 79 prior to being added in the series connection is shown in FIGURE 37. FIGURE 38 shows the resultant voltage which appears at the input terminal of the filter at point 87 subsequent to being added in the series connection but prior to being filtered. The resultant output voltage appearing at the output of the filter at point 88 is also shown in FIGURE 38 as a dashed line.

FIGURES 36, 37, and 38 show the apparent increase in response time and lower harmonic distortion since the resultant wave form of FIGURE 38 is more deeply time modulated. Also note that the output frequency of the pulsating wave at point 87 is essentially twice the frequency of either of the waves shown in FIGURES 36 and 37. It is readily apparent that the single phase inverter of FIGURE 34 could also be utilized in a 3-phase system.

Referring again to FIGURES 1 and 2, it is apparent that if the output reference oscillator 12 were removed from the inverter and an external reference voltage was substituted, the output of the inverter would be a function of the external reference voltage. Since the external reference voltage determines the $I_P$ point of the tunnel diode 25, FIGURE 2, then the output will have a definite phase, amplitude, and frequency that is determined specifically by the external reference voltage. This enables the inverter to be remotely controlled from a distant point by any external source which needs to be amplified. Accordingly, the inverter is an ideal driving source for converting direct current energy to alternating current energy which is controllable by some error or reference signal and used to drive a load such as a synchronous motor or other loads whose input must be directly related to an error or reference signal.

It will be understood that modifications and variations may be effected without departing from the spirit and scope of the novel concepts of this invention. It is to be understood, therefore, that I intend by the appended claims to cover all such changes and modifications that fall within the true spirit and scope of the invention.

What I claim as new and desire to secure by Letters Patent of the United States is:

1. A low frequency power amplifier comprising a direct current power source, power amplifier means connected to the direct current power source for converting the direct current power to alternating current square wave power, a re-set flip-flop and a drive amplifier, means connected to the power amplifier for driving the power amplifier, said means including a high frequency oscillator connected to the power amplifier through the re-set flip-flop and drive amplifier, means connected to the power amplifier for controlling the output frequency, amplitude, and phase, a low pass filter connected to the means for controlling the output frequency, amplitude, and phase, said low pass filter having a sinusoidal voltage output, means connected to the means for controlling the output frequency, amplitude, and phase for driving the means for controlling the output frequency, amplitude, and phase, and output reference oscillator means connected to the means for driving the power amplifier and to the means for driving the means for controlling the output frequency, amplitude, and phase wherein the means for driving the means for controlling the output frequency, amplitude, and phase includes a reference comparator with three inputs, the first being a signal from the means for driving the power amplifier, the second being the signal from the output reference oscillator, and the third being the output from the filter connected to the means for controlling the output frequency, amplitude, and phase.

2. A low frequency power amplifier as described in claim 1 in which the reference comparator provides an output pulse signal which has been delayed from the input reference signal of the high frequency oscillator by a time period which is a function of the difference of the output reference oscillator and the output from the low pass filter.

3. A low frequency power amplifier as described in claim 2 in which the means for controlling the output frequency, amplitude, and phase is a phase demodulator.

4. A low frequency power amplifier as described in claim 3 including a second re-set flip-flop, and a second drive amplifier connected between the reference comparator and the phase demodulator in which the reference comparator compares the output voltage and operates off the difference between the ouput voltage and the reference voltage to introduce a delay which when divided by the second flip-flop and amplified by the second drive amplifier controls the phase demodulator to maintain a constant output voltage.

5. A low frequency power amplifier as described in claim 4 in which the phase demodulator includes a set of bi-lateral switches for handling current flow in either direction responsive to a control signal.

6. A low frequency power amplifier as described in claim 5 in which each bi-lateral switch includes an NPN transistor and three diodes, the first and the second diodes having their anode electrodes connected to each other, the first and third diodes having their cathode electrodes connected to each other, the cathode electrode of the second diode being connected to the anode electrode of the third diode, the NPN transistor having its collector electrode connected between the cathode electrodes of the first and third diode, its emitter electrode connected between the anode electrodes of the first and second diodes, and to the second drive amplifier and the low pass filter, and its base electrode connected to the second drive amplifier, the power amplifier being connected between the cathode electrode of the second diode and the anode electrode of the third diode.

7. A phase demodulated high frequency inverter comprising a direct current source, a controlled voltage supply connected to the direct current source, a high frequency oscillator connected to the controlled voltage supply, a reference comparator, two flip-flops, a first flip-flop connected to the high frequency oscillator and the reference comparator, the second flip-flop being also connected to the reference comparator, a power amplifier connected to the direct current source at a connection common to the controlled voltage supply, one drive amplifier connected between the power amplifier and the first flip-flop, a phase demodulator connected to the power amplifier, a second drive amplifier connected between the phase demodulator and the second flip-flop, a filter connected between the phase demodulator and a connection common to the output and the reference comparator, and an output reference oscillator connected to the reference comparator and to a connection common to the controlled voltage supply and the high frequency oscillator.

8. A low frequency power amplifier adapted for the production of three-phase output comprising a direct current power source, power amplifier means connected to the direct current power source for converting the direct current power to alternating current square wave power, means connected to the power amplifier for driving the power amplifier, means connected to the power amplifier for controlling the output frequency, amplitude, and phase, three low pass filters connected to the means for controlling the output frequency, amplitude, and phase, said low pass filters each having a sinusoidal voltage output, means connected to the means for controlling the output frequency, amplitude, and phase for driving the means for controlling the output frequency, amplitude, and phase, and output reference oscillator means connected to the means for driving the power amplifier and to the means for driving the means for controlling the output frequency, amplitude, and phase, including phase splitter means connected between the output reference oscillator and the means for driving the means for controlling the output frequency, amplitude, and phase for dividing the output of the output reference oscillator into three sinusoidal voltages having a phase angle of 120° between phases in which the means for driving the means for controlling the output frequency, amplitude, and phase includes three reference comparators, the first reference comparator having three inputs, the first input being a signal from the means for driving the power amplifier, the second input being a signal from the phase splitter, and the third input being the output from the first low pass filter connected to the means for controlling the output frequency, amplitude, and phase, the second reference comparator having two inputs the first input being a signal from the phase splitter and the second input being the output from the second low pass filter, and the third reference comparator having two inputs, the first input being a signal from the phase splitter and the second input being the output from the third low pass filter.

9. A low frequency power amplifier as described in claim 8 including a re-set flip-flop and a drive amplifier in which the means for driving the power amplifier is a high frequency oscillator connected to the power amplifier through the re-set flip-flop and drive amplifier.

10. A low frequency power amplifier as described in claim 9 in which each reference comparator provides an output pulse signal which has been delayed from the input reference signal of the high frequency oscillator by a time period which is a function of the difference of the output reference oscillator and the output from the low pass filter.

11. A low frequency power amplifier as described in claim 10 in which the means for controlling the output frequency, amplitude, and phase includes three phase demodulators each connected to the power amplifier, the first phase demodulator being also connected to the first low pass filter and the first reference comparator, the second phase demodulator being also connected to the second low pass filter and the second reference comparator, and the third phase demodulator being also connected to the third low pass filter and the third reference comparator.

12. A low frequency power amplifier as described in claim 11 including second, third, and fourth re-set flip-flop means and second, third, and fourth drive amplifier means the second re-set flip-flop and the second drive amplifier being connected between the first reference comparator and the first phase demodulator, the third re-set flip-flop and the third drive amplifier being connected between the second reference comparator and the second phase demodulator and the fourth re-set flip-flop and the fourth drive amplifier being connected between the third reference comparator and the third phase demodulator in which each reference comparator compares the output voltage with the reference voltage and operates off the difference between the output voltage and the reference voltage to introduce a delay which when divided by its co-acting flip-flop and amplified by its co-acting drive amplifier controls the phase demodulator to which it is connected to maintain a constant output voltage.

13. A low frequency power amplifier as described in claim 12 in which each phase demodulator includes a set of bi-lateral switches for handling current flow in either direction responsive to a control signal.

14. A low frequency power amplifier as described in claim 13 in which each bi-lateral switch includes an NPN transistor and three diodes, the first and the second diodes having their anode electrodes connected to each other, the first and the third diodes having their cathode electrodes connected to each other, the cathode electrode of the second diode being connected to the anode electrode of the third diode, the NPN transistor having its collector electrode connected between the cathode electrodes of the first and third diodes, its emitter electrode connected between the anode electrodes of the first and second diodes and to its co-acting drive amplifier and its co-acting low pass filter, and its base electrode connected to its co-acting drive amplifier, the power amplifier being connected between the cathode electrode of the second diode and the anode electrode of the third diode.

15. A low frequency power amplifier as described in claim 13 in which the power amplifier has three sets of transformer secondary windings, the first set of transformer secondary windings being connected to the first phase demodulator, the second set of transformer secondary windings being connected to the second phase demodulator, and the third set of transformer secondary windings being connected to the third phase demodulator.

16. A low frequency power amplifier including two power amplifiers operated 90° out of phase, two phase demodulators one connected to each power amplifier, a first and a second flip-flop and a first and a second amplifier for driving the phase demodulators, the first flip-flop and the first drive amplifier being connected to the first phase demodulator, the second flip-flop and the second drive amplifier being connected to the second phase demodulator, an output reference oscillator connected to the first and second flip-flops, a third flip-flop for developing the 90° phase shift, a fourth flip-flop and a third drive amplifier connected between the third flip-flop and the first power amplifier and a fifth flip-flop and a fourth drive amplifier connected between the third flip-flop and the second power amplifier, the first and second flip-flops being connected, the first and fourth flip-flops being connected and the second and fifth flip-flops being connected, a high frequency oscillator for driving the power amplifiers through the third, fourth, and fifth flip-flops and the third and fourth drive amplifiers, and a low pass filter connected to the phase demodulators for filtering the output voltage.

References Cited

UNITED STATES PATENTS

| | | | |
|---|---|---|---|
| 2,977,518 | 3/1961 | Kafka et al. | 318—138 |
| 3,321,693 | 5/1967 | Heinrich et al. | 321—5 |
| 3,324,376 | 6/1967 | Hunt | 321—8 X |
| 3,334,292 | 8/1967 | King et al. | 321—45 |
| 3,346,794 | 10/1967 | Stemmler | 321—5 X |

OTHER REFERENCES

Turnbull, "Selected Harmonic Reduction in Static DC-AC Inverters," IEEE transactions, July 1964, pp. 374–378.

JOHN F. COUCH, *Primary Examiner.*

W. H. BEHA, Jr., *Assistant Examiner.*